United States Patent
Begino, III et al.

(10) Patent No.: US 11,342,758 B2
(45) Date of Patent: May 24, 2022

(54) PRIORITY LOAD SHARING FOR ELECTRICAL POWER SYSTEMS HAVING MULTIPLE POWER SOURCES

(71) Applicant: Astec International Limited, Kowloon (HK)

(72) Inventors: John Faustino Begino, III, Pasig (PH); Nathaniel Franco Neri, Taguig (PH)

(73) Assignee: Astec International Limited, Kowloon (HK)

( * ) Notice: Subject to any disclaimer, the term of this patent is extended or adjusted under 35 U.S.C. 154(b) by 0 days.

(21) Appl. No.: 17/178,477

(22) Filed: Feb. 18, 2021

(65) Prior Publication Data

US 2021/0175723 A1 Jun. 10, 2021

Related U.S. Application Data

(63) Continuation of application No. 16/206,257, filed on Nov. 30, 2018, now Pat. No. 10,931,116.

(60) Provisional application No. 62/650,025, filed on Mar. 29, 2018.

(51) Int. Cl.
*H02J 3/46* (2006.01)
*H02J 9/00* (2006.01)

(52) U.S. Cl.
CPC . *H02J 3/46* (2013.01); *H02J 9/00* (2013.01)

(58) Field of Classification Search
CPC .................................... H02J 3/46; H02J 9/00
USPC ..................................................... 307/64, 65
See application file for complete search history.

(56) References Cited

U.S. PATENT DOCUMENTS

| | | |
|---|---|---|
| 6,643,152 B2 | 11/2003 | Tokunaga et al. |
| 10,343,533 B2 * | 7/2019 | Harada ................. H02J 7/1492 |
| 2008/0164759 A1 | 7/2008 | Sharma et al. |
| 2010/0025127 A1 * | 2/2010 | Oyobe .................... B60K 15/04 180/65.22 |
| 2010/0225285 A1 * | 9/2010 | Ting ...................... H02J 7/0071 323/234 |
| 2017/0170683 A1 | 6/2017 | Navarro et al. |
| 2019/0334337 A1 | 10/2019 | Kalaba |
| 2020/0153255 A1 | 5/2020 | Inoue et al. |

* cited by examiner

*Primary Examiner* — Michael R. Fin

(57) ABSTRACT

Example electrical power systems include an output for supplying a DC output voltage to a load, a first power source connected with the output to supply DC power to the load, and a second power source connected with the output to supply DC power to the load. The electrical power system is configured to supply DC power to the load using only the first power source when a demand of the load is less than an output capacity of the first power source, and the second power source is configured to maintain an enabled on-state when only the first power source is supplying DC power to the load. Additional electrical power systems and methods are also disclosed.

20 Claims, 7 Drawing Sheets

PRIORITY LOAD SHARING FOR ELECTRICAL POWER SYSTEMS HAVING MULTIPLE POWER SOURCES

CROSS-REFERENCE TO RELATED APPLICATION

This application claims the benefit of and priority of U.S. application Ser. No. 16/206,257, filed Nov. 30, 2018, which claims the benefit of and priority to U.S. Provisional Application No. 62/650,025, filed Mar. 29, 2018. The entire disclosures of the above applications are incorporated herein by reference.

FIELD

The present disclosure relates to priority load sharing for electrical power systems having multiple power sources.

BACKGROUND

This section provides background information related to the present disclosure which is not necessarily prior art.

Some power systems having multiple power sources implement priority load sharing by turning different power sources on and off as needed in a priority sequence (e.g., by using enable/disable commands, etc.). For example, a power source having a higher priority may supply power to a load when a demand of the load is low, and an additional power source having a lower priority can be enabled to supply additional power to the load when the demand of the load increases.

Other power systems implement priority load sharing by connecting and disconnecting different power sources from a load as needed in a priority sequence (e.g., by controlling switches that connect/disconnect a power source to/from an output bus, etc.).

SUMMARY

This section provides a general summary of the disclosure, and is not a comprehensive disclosure of its full scope or all of its features.

According to one aspect of the present disclosure, an electrical power system includes an output for supplying a DC output voltage to a load, a first power source connected with the output to supply DC power to the load, and a second power source connected with the output to supply DC power to the load. The electrical power system is configured to supply DC power to the load using only the first power source when a demand of the load is less than an output capacity of the first power source, and the second power source is configured to maintain an enabled on-state when only the first power source is supplying DC power to the load.

According to another aspect of the present disclosure, an electrical power system includes an output for supplying a DC output voltage to a load, a first power source connected with the output to supply DC power to the load, and a second power source connected with the output to supply DC power to the load. The electrical power system is configured to supply DC power to the load using only the first power source when a demand of the load is less than an output capacity of the first power source, and the first power source and the second power source are each configured to selectively supply DC power to the load without receiving a command from the load, and without disconnecting one of the power sources from the output.

According to another aspect of the present disclosure, a method of prioritizing load sharing in an electrical power system is disclosed. The electrical power system includes an output for supplying a DC output voltage to a load, a first power source connected with the output, and a second power source connected with the output. The method includes supplying DC power to the load using only the first power source when a demand of the load is less than an output capacity of the first power source, and supplying DC power to the load using both the first power source and the second power source when a demand of the load is greater than an output capacity of the first power source. The method also includes maintaining the second power source in an enabled on-state when only the first power source is supplying DC power to the load.

Further aspects and areas of applicability will become apparent from the description provided herein. It should be understood that various aspects and features of this disclosure may be implemented individually or in combination with one or more other aspects or features. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding features throughout the several views of the drawings.

DETAILED DESCRIPTION

Figure 1:
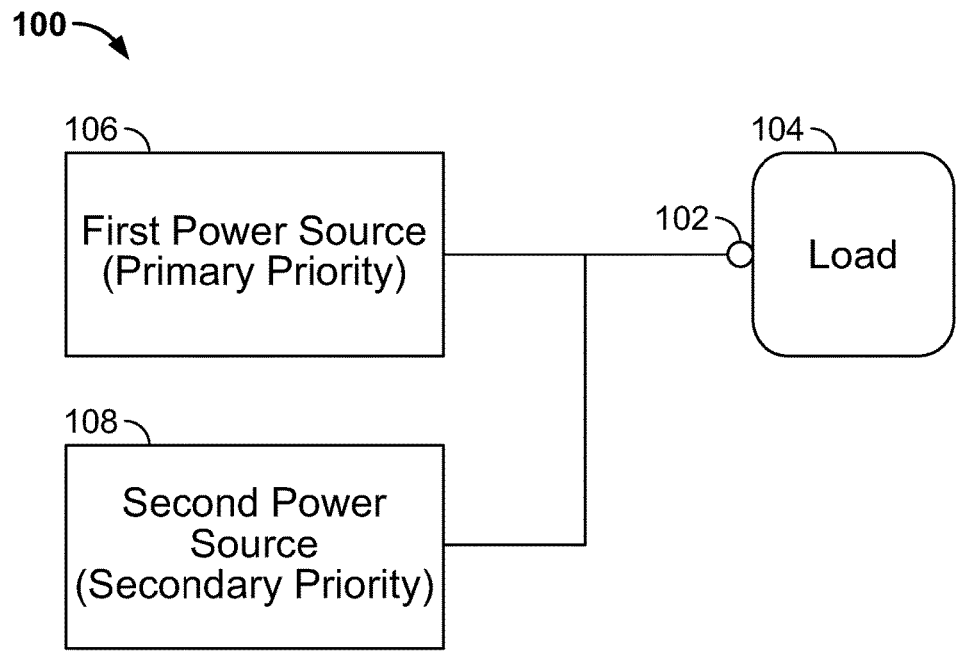
FIG. 1 is block diagram of an electrical power system according to one example embodiment of the present disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments will now be described more fully with reference to the accompanying drawings.

A power system according to one example embodiment of the present disclosure is illustrated in FIG. 1, and indicated generally by reference number 100. As shown in FIG. 1, the electrical power system 100 includes an output 102 for supplying a DC output voltage to a load 104, a first power source 106 connected with the output 102 to supply DC power to the load 104, and a second power source 108 connected with the output 102 to supply DC power to the load 104.

The electrical power system 100 is configured to supply DC power to the load 104 using only the first power source 106 when a demand of the load is less than an output capacity of the first power source 106, and the second power source 108 is configured to maintain an enabled on-state when only the first power source 106 is supplying DC power to the load 104.

For example, the first power source 106 may have a primary priority setting that causes only the first power source 106 to supply DC power to the load 104 when a demand of the load is less than an output capacity of the first power source 106. The first power source 106 may be configured to regulate the DC output voltage in a constant voltage regulation mode when the demand of the load 104 is less than the output capacity of the first power source 106, and to enter a constant current or constant power mode when the demand of the load 104 exceeds the output capacity of the first power source 106.

The second power source 108 may include a secondary priority setting that causes the second power source 108 to supply DC power to the load 104 only when the demand of the load 104 exceeds the output capacity of the first power source 106. The second power source 108 may be configured to regulate the DC output voltage in a constant voltage regulation mode while the first power source 106 is operating in the constant current or constant power mode.

As described above, the system 100 provides a load sharing scheme between the first power source 106 and the second power source 108 where each power source 106 and 108 has a different priority level (i.e., the first power source 106 has a higher priority level than the second power source 108).

The first power source 106 operates in a constant voltage regulation mode while the demand of the load 104 is below the output capacity (e.g., a maximum output capacity, etc.) of the first power source 106. Once the demand of the load 104 exceeds the output capacity of the first power source 106, the first power source 106 enters a constant current or constant power mode (e.g., a constant power protection mode).

For example, the constant voltage regulation mode may include a closed control loop to maintain the DC output voltage of the output 102 at a specified (e.g., preset) value. In some cases, a power converter (e.g., a switched-mode power supply (SMPS), etc.) of the first power source 106 may sense the DC output voltage and adjust a duty cycle, a frequency, etc. of the power converter to maintain the DC output voltage at the specified value.

If the demand of the load 104 increases to exceed an output capacity (e.g., a rated output current) of the power converter, the converter may enter the constant power mode as described above. In the constant power mode, the power converter of the first power source 106 may control its duty cycle, frequency, etc. to decrease output voltage as the output current demand increases to maintain a constant output power. The constant output power may be represented by multiplying the output voltage and the output current, and may be equivalent to rated output power.

The constant current mode may inhibit a power source from exceeding its rated current when the demand of the load 104 exceeds an individual power source capacity (e.g., when multiple power converters are operating in parallel). A power converter may enter the constant current mode when the demand of the load 104 increases to reach a maximum current capacity of the power converter. At this point, a duty cycle, frequency, etc. of the power converter may be controlled to maintain a constant output current, which may be equivalent to a maximum allowed operating current limit of the power converter.

Once the demand of the load 104 exceeds the output capacity of the first power source 106 and the first power source 106 enters a constant current or constant power mode, the second power source 108 starts to deliver power to the load 104 in a priority load sharing arrangement with the first power source 106. The priority load sharing between the first power source 106 and the second power source 108 may include droop current share control, active current share control, etc.

For example, the second power source 108 may be configured to start supplying DC power to the load 104 in response to the demand of the load 104 increasing from a value less than the output capacity of the first power source 106 to a value greater than the output capacity of the first power source 106. The second power source 108 may be configured to stop supplying DC power to the load 104 in response to the demand of the load 104 decreasing from a value greater than the output capacity of the first power source 106 to a value less than the output capacity of the first power source 106.

Additionally, or alternatively, the first power source 106 may be configured to switch from the constant voltage regulation mode to the constant current or constant power mode in response to the demand of the load 104 increasing from a value less than the output capacity of the first power source 106 to a value greater than the output capacity of the first power source 106. The first power source 106 may be configured to switch from the constant current or constant power mode to the constant voltage regulation mode in response to the demand of the load 104 decreasing from a value greater than the output capacity of the first power source 106 to a value less than the output capacity of the first power source 106.

Figure 2:
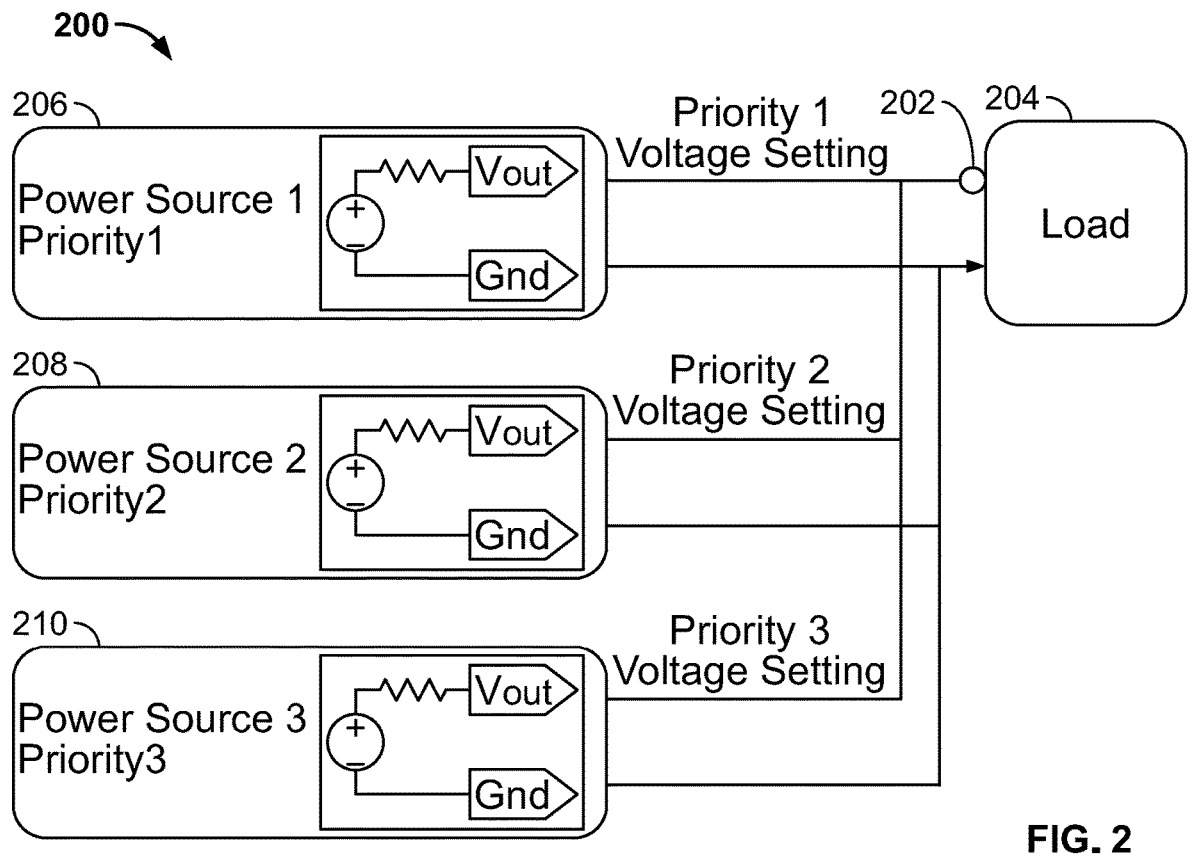
FIG. 2 is block diagram of an electrical power system having three power sources, according to another example embodiment of the present disclosure.

FIG. 2 illustrates an electrical power system 200 according to another example embodiment of the present disclosure. The electrical power system 200 is similar to the electrical power system 100 of FIG. 1, but the electrical power system 200 includes a third power source 210.

Specifically, the electrical power system 200 includes an output 202 for supplying a DC output voltage to a load 204, a first power source 206 connected with the output 202, a second power source 208 connected with the output, and the third power source 210 connected with the output 202.

The third power source 210 may have a tertiary priority setting where the third power source 210 supplies DC power to the load 204 only when the demand of the load 204 exceeds the output capacity of the first power source 206 and an output capacity of the second power source 208 (e.g., a combined output capacity of the first and second power sources 206 and 208).

The third power source 210 is configured to regulate the DC output voltage in a constant voltage regulation mode while the first power source 206 is operating in the constant current or constant power mode and the second power source 208 is operating in a constant current or constant power mode. The third power source 210 is configured to maintain an enabled on-state during a period where only the first power source 206 or only the first and second power sources 206 and 208 are supplying DC power to the load 204.

For example, the first power source 206 has the highest load priority (Priority 1). The first power source 206 may supply DC power to the load 204 when the load demand starts. As the load demand increases to reach and exceed the output capacity (e.g., maximum output capacity) of the first power source 206, the first power source 206 will enter constant current (CC) or constant power (CP) mode. In this mode, the first power source may continuously supply a full rated current/power capacity of the first power source 206 to the load 204.

As the load demand increases beyond the output capacity of the first power source 206, the second power source 208 will start supplying and sharing the DC power demanded by the load 204. At this point, both the first power source 206 and the second power source 208 are supplying DC power to the common load 204. The first power source 206 is operating in the CC/CP protection mode while the second power source 208 determines the DC output voltage to the load 204. At this stage, the second power source 208 is operating in a constant voltage (CV) regulation mode.

As the load demand further increases to reach and exceed an output capacity of the second power source 208, the second power source 208 will enter into a constant current (CC) or constant power (CP) protection mode, where the second power source 208 may continue to supply the full rated current/power capacity of the second power source 208 to the load 204. At this point, the first power source 206 and the second power source 208 are both operating in CC/CP protection mode and supplying their full combined current/power capacity to the load 204.

As the load demand further increases beyond the combined capacity of the first and second power sources 206 and 208, the third power source 210 will start supplying and sharing the power demanded by the load 204. At this point, the first and second power sources 206 and 208 are both operating in the CC/CP protection mode while the third power source 210 determines the DC output voltage to the load 204 by operating in a constant voltage (CV) regulation mode, and all three power sources 206, 208 and 210 are sharing and delivering power to the load 204.

As the load demand further increases beyond the total combined capacity of the three power sources 206, 208 and 210, the third power source 210 will enter the CC/CP protection mode so that all three power sources 206, 208 and 210 are operating in the CC/CP protection mode, and the output voltage may be determined by load impedance.

In the opposite direction, as the load demand decreases (e.g., below the combined output capacity of all three power sources 206, 208 and 210), the third power source 210 will exit the CC/CP protection mode and will determine the DC output voltage by operating in the CV mode. As the load demand further decreases (e.g., below the combined output capacity of the first and second power sources 206 and 208), the third power source 210 may be completely unloaded (e.g., stop supplying DC power to the load 204). In this case, the second power source 208 will exit the CC/CP protection mode and will determine DC output voltage by operating in the CV mode.

As the load demand further decreases (e.g., below the output capacity of the first power source 206), the second power source 208 may be completely unloaded (e.g., stop supplying power to the load 204). In this case, the first power source 206 will exit the CC/CP protection mode and will determine DC output voltage by operating in the CV mode.

As described above, the load sharing sequence of the three power sources 206, 208 and 210 may be determined by different priority levels (e.g., priority settings) of the three power sources 206, 208 and 210. For example, the three power sources 206, 208 and 210 may implement droop current sharing control as illustrated in FIG. 3.

Figure 3:
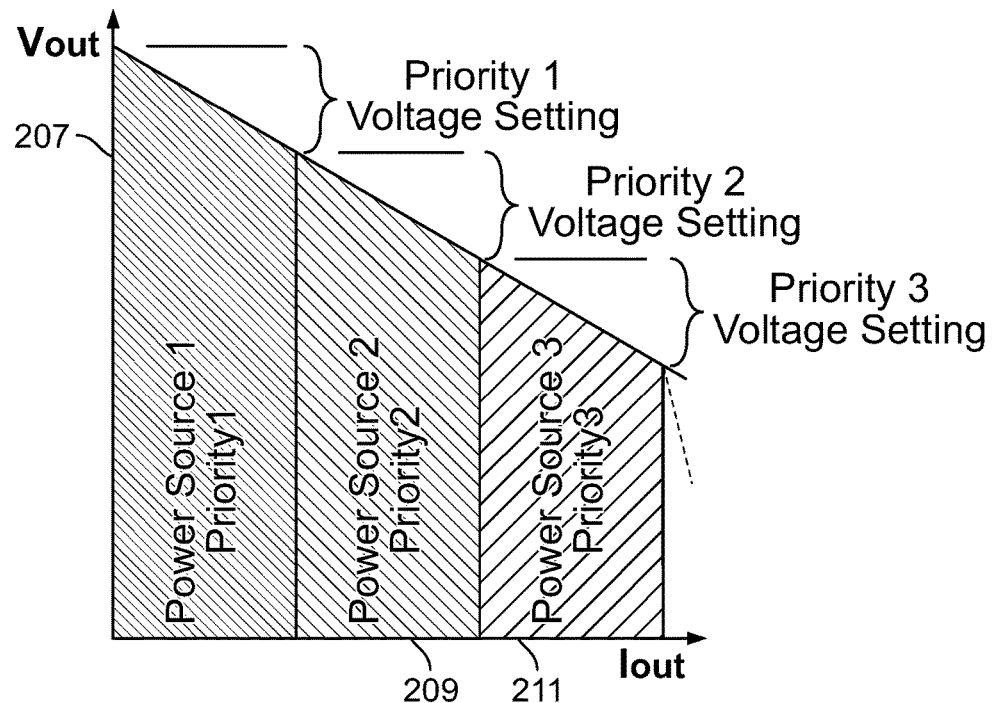
FIG. 3 is a bar graph of a droop V-I characteristic of the power sources of FIG. 2.

FIG. 3 illustrates individual droop V-I characteristics (e.g., droop load lines) of the individual power sources 206, 208 and 210. Specifically, region 207 is a droop V-I characteristic of the first power source 206, region 209 is a droop V-I characteristic of the second power source 208, and region 211 is a droop V-I characteristic of the third power source 210.

As shown in FIG. 3, the droop V-I characteristics of the three power sources 206, 208 and 210 may coincide with one another. For example, a lower droop load line threshold of the first power source 206 is the same as an upper droop load line threshold of the second power source 208. Similarly, a lower droop load line threshold of the second power source 208 is the same as an upper droop load line threshold of the third power source 210. Therefore, the combined droop load line of the three power sources 206, 208 and 210 represents a continuous straight line without a gap or an overlap.

In other embodiments, the combined droop load line of the three power sources 206, 208 and 210 may be different from a continuous straight load line. For example, the upper and lower thresholds of adjacent power sources may overlap one another, the upper and lower thresholds of adjacent power sources may be spaced from one another by a gap, etc. In some cases, the slope of the combined droop load line may be different from the slope illustrated in FIG. 3.

In one specific example, the first power source 206 may include an upper threshold of 365V and a lower threshold of 359V, the droop load line of the second power source 208 may include an upper threshold of 359V and a lower threshold of 356V, and the droop load line of the third power source 210 may extend down from an upper threshold of 356V.

Because the different power sources 206, 208 and 210 have different voltage regulation settings, each power source 206, 208 and 210 may maintain an enabled on-state during a period where the power source is not supplying power to the load 204. For example, the power sources 208 and 210 may maintain an enabled on-state during a period where only the first power source 206 is supplying DC power to the load 204. This may occur because the first power source 206 is regulating the voltage at a droop load line voltage setting of the first power source (e.g., 365V to 359V) that is higher than the droop load line voltage setting of the second power source 208 (e.g., 359V to 356V) and the third power source 210 (e.g., below 356V).

Once the voltage at the output 202 drops to a droop load line voltage setting range of the second power source 208 (e.g., 359V to 356V) because a demand of the load 204 has exceeded the capacity of the first power source 206 to maintain the output voltage at the higher droop load line voltage setting range of the first power source 206 (e.g., 365V to 359V), the second power source 208 may start supplying DC power to the load 204 without receiving a command from the load 204, without enabling or disabling one of the power sources 206, 208 and 210, without connecting or disconnecting one of the power sources 206, 208 and 210 from the output 202, etc.

Similarly, the third power source 210 may maintain an enabled on-state during a period where only the first and second power sources 206 and 208 are supplying power to the load 204. This may occur because the second power source is regulating the DC output voltage in the droop load line voltage setting range of the second power source (e.g., 359V to 356V) that is higher than the droop load line voltage setting range of the third power source 210 (e.g., below 356V).

Once the voltage at the output 202 drops to the droop load line voltage setting range of the third power source 210 (e.g., below 356V) because a demand of the load 204 has exceeded the capacity of the combined first and second power sources 206 and 208 to maintain the DC output voltage in the higher droop load line voltage setting range of the second power source 208 (e.g., 359V to 356V), the third power source 210 may start supplying DC power to the load 204 without receiving a command from the load 204, without enabling or disabling one of the power sources 206, 208 and 210, without connecting or disconnecting one of the power sources 206, 208 and 210 from the output 202, etc.

Figure 4:
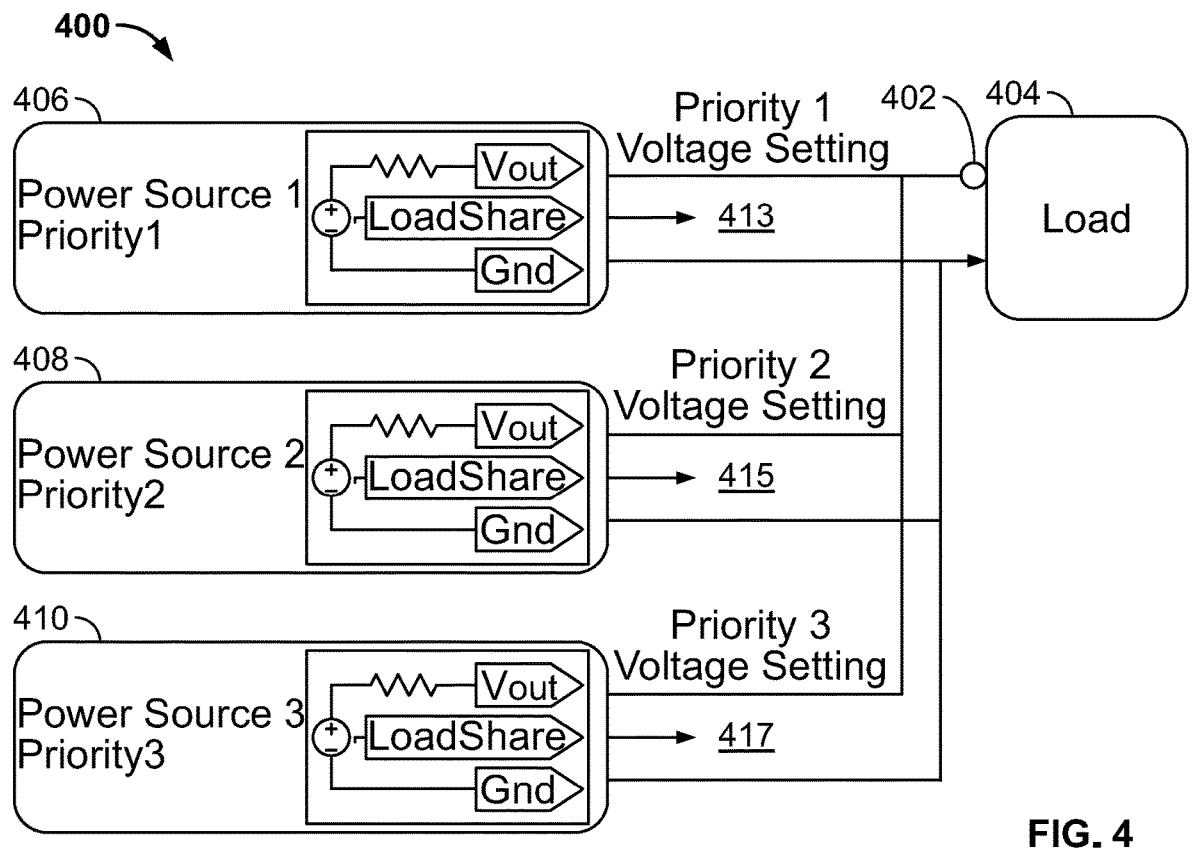
FIG. 4 is block diagram of an electrical power system including three power sources using an active current share control, according to another example embodiment of the present disclosure.

FIG. 4 illustrates an electrical power system 400 according to another example embodiment of the present disclosure. The electrical power system 400 is similar to the electrical power system 200 of FIG. 2, but the electrical power system 400 operates according to an active current share control.

Specifically, the electrical power system 400 includes an output 402 for supplying a DC output voltage to a load 404, a first power source 406 connected with the output 402, a second power source 408 connected with the output, and the third power source 410 connected with the output 402.

The first power source 406 includes a first load share bus 413, the second power source 408 includes a second load share bus 415, and the third power source 410 includes a third load share bus 417. The load share buses 413, 415 and 417 are independent of one another and are not tied together (e.g., connected with one another, etc.).

Load share buses having different priority levels are preferably not tied up together to avoid violating a priority load share scheme. However, power sources at the same priority level may have their load share buses tied up together to provide active current sharing among the power sources at the same priority level. For example, if six different power supply units (PSUs) have the same priority level, the load share buses of each of the six different PSUs may be tied up together as a single common load share bus.

Figure 5:
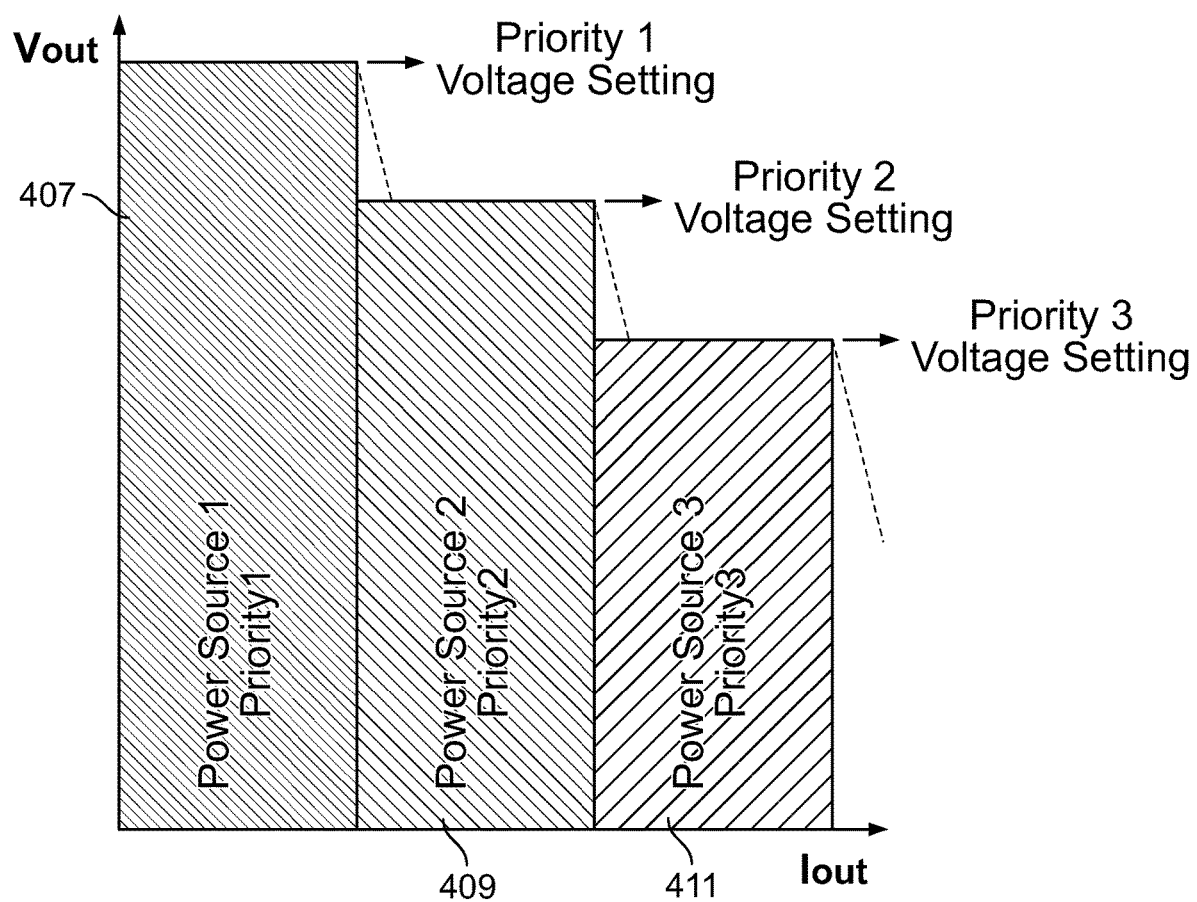
FIG. 5 is a bar graph of an active current control V-I characteristic of the power sources of FIG. 4.

FIG. 5 illustrates individual active current control V-I characteristics (e.g., load lines) of the individual power sources 406, 408 and 410. Specifically, region 407 is a V-I characteristic of the first power source 406, region 409 is a V-I characteristic of the second power source 408, and region 411 is a V-I characteristic of the third power source 410.

As shown in FIG. 5, an output voltage regulation setting of the first power source 406 is greater than an output voltage regulation setting of the second power source 408. The output voltage regulation setting the first power source 406 is separated from the output voltage regulation setting the second power source 408 by at least a specified guard band value to inhibit interaction of the first power source 406 and the second power source 408 (e.g., interaction of the first load share bus 413 and the second load share bus 415). As one example, the output voltage regulation setting of the first power source 406 is 12.6V and the output voltage regulation setting of the second power source 408 is 12.4V.

Under this example priority load sharing scheme using active current control, each power source 406, 408 and 410 may have a separate load share bus and output voltage regulation setting. As descried in the example above, the higher priority first power source 406 (i.e., Priority1) may regulate the output to a higher DC voltage (e.g., 12.6V), as compared to the lower priority sources 408 and 410.

The second power source 408 (i.e., Priority2) may regulate the output to a DC voltage (e.g., 12.4V) that is lower than the output voltage regulation setting of the first power source 406 but higher than the output voltage regulation setting of the third power source 410. The third power source 410 (i.e., Priority3) may regulate the output to a DC voltage (e.g., 12.0V) that is lower than the higher priority sources 406 and 408.

Because the different power sources 406, 408 and 410 have different output voltage regulation settings, each power source 406, 408 and 410 may maintain an enabled on-state during a period where the power source is not supplying DC power to the load 404. For example, the power sources 408 and 410 may maintain an enabled on-state during a period where only the first power source 406 is supplying DC power to the load 404. This may occur because the first power source 406 is regulating the voltage at an output voltage regulation setting of the first power source (e.g., 12.6V) that is higher than the output voltage regulation settings of the second power source 408 (e.g., 12.4V) and the third power source 410 (e.g., 12.0V).

Once the voltage at the output 402 drops to the output voltage regulation setting of the second power source 408 (e.g., 12.4V) because a demand of the load 404 has exceeded the capacity of the first power source 406 to maintain the DC output voltage at the higher output voltage regulation setting of the first power source 406 (e.g., 12.6V), the second power source 408 may start supplying DC power to the load 404 without receiving a command from the load 404, without enabling or disabling one of the power sources 406, 408 and 410, without connecting or disconnecting one of the power sources 406, 408 and 410 from the output 402, etc.

Similarly, the third power source 410 may maintain an enabled on-state during a period where only the first and second power sources 406 and 408 are supplying DC power to the load 404. This may occur because the combined first and second power sources 406 and 408 are regulating the DC output voltage at an output voltage regulation setting of the second power source (e.g., 12.4V) that is higher than the output voltage regulation setting of the third power source 410 (e.g., 12.0V).

Once the voltage at the output 402 drops to an output voltage regulation setting of the third power source 410 (e.g., 12.0V) because a demand of the load 404 has exceeded the capacity of the combined first and second power sources 406 and 408 to maintain the DC output voltage at the higher output voltage regulation setting of the second power source 408 (e.g., 12.4V), the third power source 410 may start supplying DC power to the load 404 without receiving a command from the load 404, without enabling or disabling one of the power sources 406, 408 and 410, without connecting or disconnecting one of the power sources 406, 408 and 410 from the output 402, etc.

In some embodiments, a load share bus voltage on each power source 406, 408 and 410 may have a same load share bus voltage definition (e.g., 8V at a full rated current of the power source). However, the load share bus of each power source 406, 408 and 410 may only be connected with power supplying device(s) within that same power source (e.g., having the same priority level). The load share buses of different priority power sources may not be connected together.

Priority levels may be assigned to the power sources 406, 408 and 410 as part of a system power distribution plan. For example, AC-DC rectifiers may be defined as Priority1 source(s) (i.e., primary), while backup battery units (BBUs) may be defined as Priority2 source(s) (i.e., secondary).

In some cases, the system 400 may perform load scheduling based on a demand from the load 404, and may enable and disable power sources that support a peak power load condition without exceeding an input rated power from a utility of a primary (e.g., Priority1) source.

Figure 6:
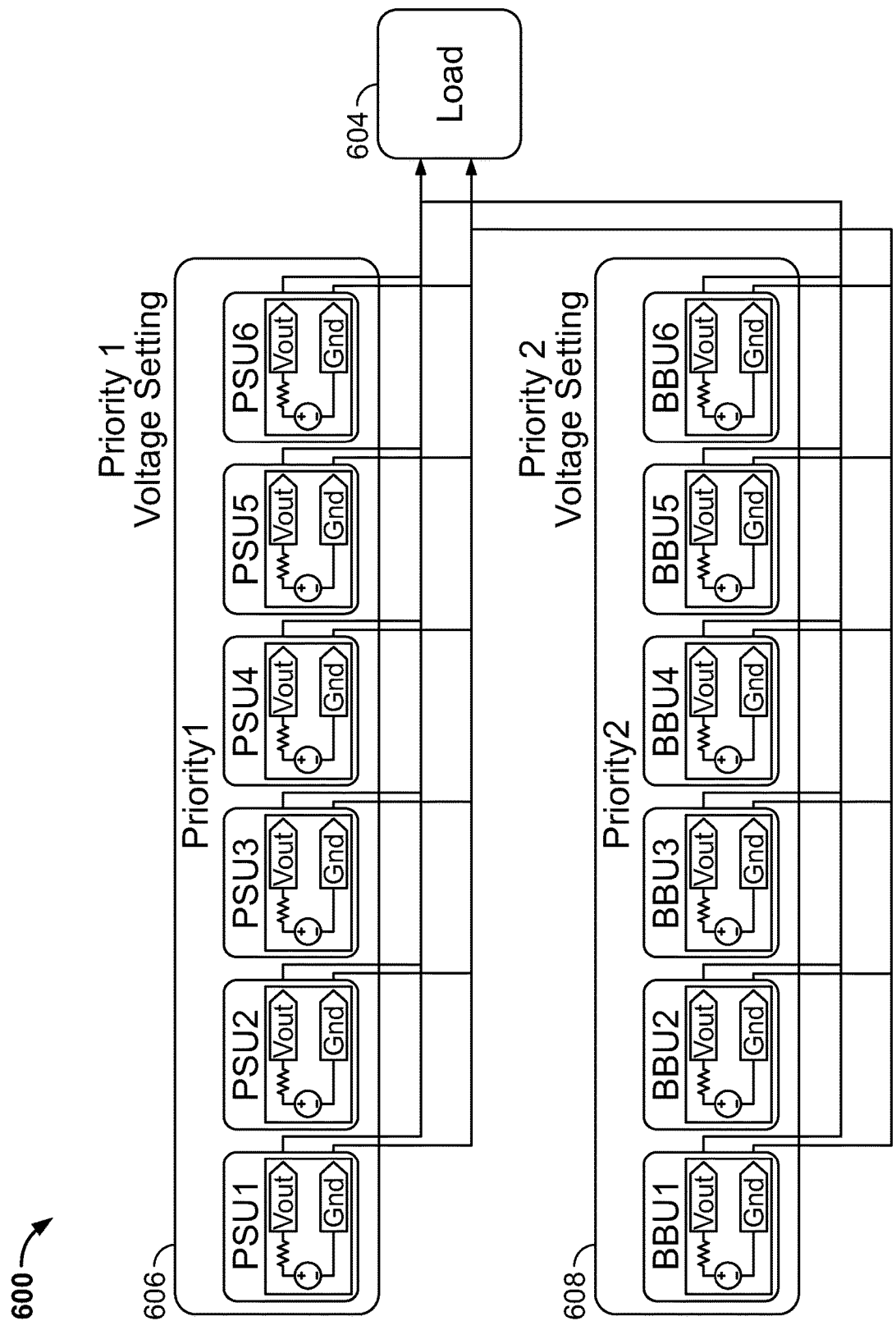
FIG. 6 is a block diagram of an electrical power system including a power supply unit and a battery backup unit using droop current share control, according to another example embodiment of the present disclosure.

FIG. 6 illustrates an electrical power system 600 according to another example embodiment of the present disclosure. The electrical power system 600 is similar to the electrical power system 200 of FIG. 2, but the first power source 606 of the power system 600 includes six power supply units PSU1, PSU2, PSU3, PSU4, PSU5 and PSU6. The second power source 608 includes six battery backup units BBU1, BBU2, BBU3, BBU4, BBU5 and BBU6.

As shown in FIG. 6, positive output terminals of the six power supply units of the first power source 606 and the six battery backup units of the second power source 608 are tied together (e.g., connected with one another) to supply DC power to the common load 604. Similarly, negative output terminals of the six power supply units of the first power source 606 and the six battery backup units of the second power source 608 are tied together.

In one example, a droop load line of the six power supply units of the first power source 606 extends from about 365V to about 359V, and a droop load line of the six battery backup units of the second power source 608 (which has a lower priority than the first power source 606) extends from about 359V to about 356V.

In this case, the six power supply units of the first power source 606 will share the load demand via a droop current share method along the droop load line from 365V to 359V. At 359V, the output capacity of the first power source 606 is exhausted, and the first power source 606 enters a protection mode of CC/CP while continuing to deliver the full output capacity of the first power source 606.

As the load demand increases, the six backup battery units of the second power source 608 (having the lower priority) will start to deliver DC power to the common load 604 in addition to the power delivered to the load 604 from the first power source 606. At this point, the six backup battery units of the second power source 608 dictate the DC output voltage, and all the power supply units and the battery backup units share and deliver power to the load 604.

At 356V, the total combined output capacity of the first and second power sources 606 and 608 is exhausted, and the first and second power sources will both be in a protection operation mode. In the opposite direction, as the load demand decreases the DC output voltage will track back from 356V to 365V until the protection modes of both power sources 606 and 608 are disabled and the load demand goes low.

Figure 7:
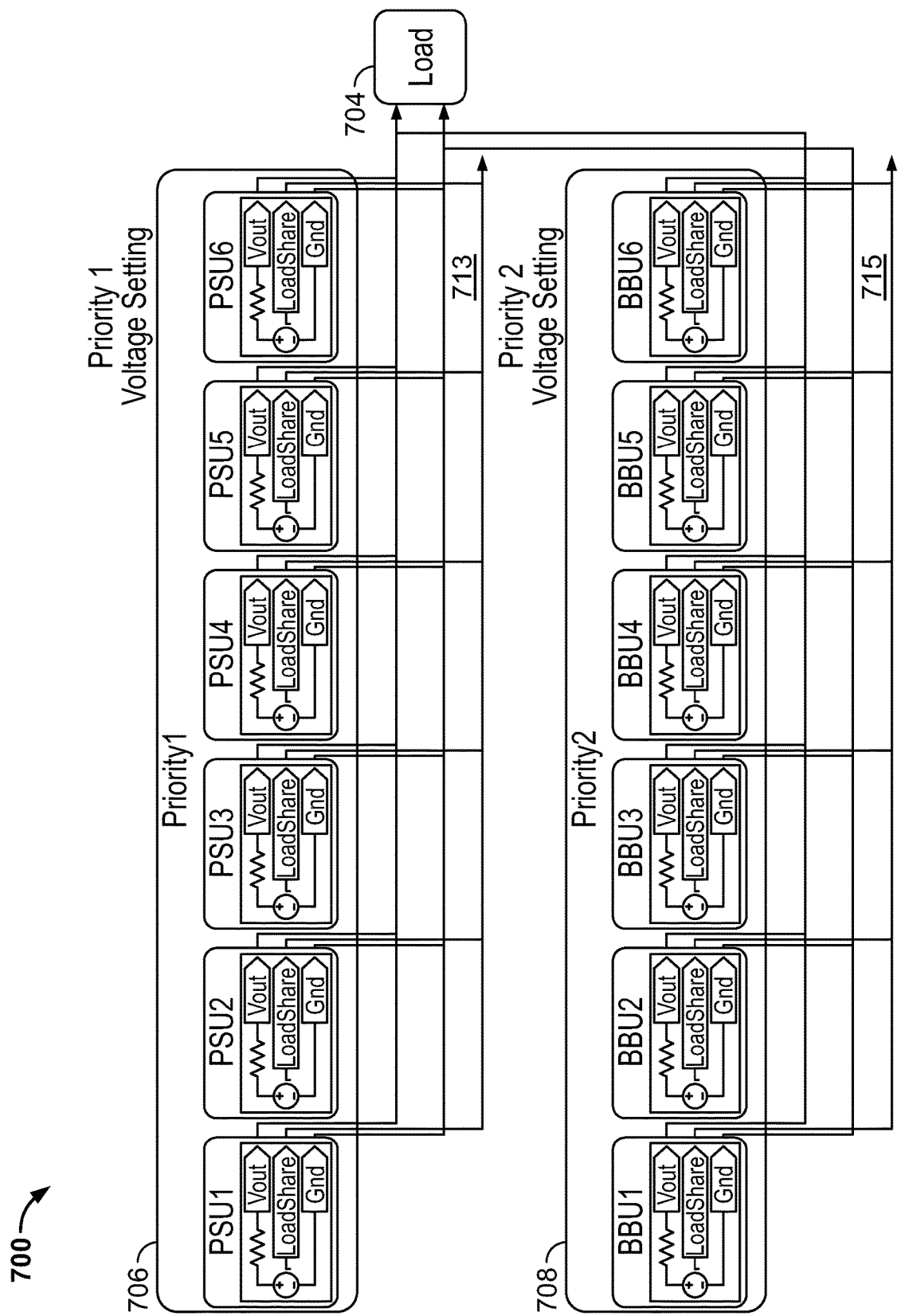
FIG. 7 is a block diagram of an electrical power system including a power supply unit and a battery backup unit using active current share control, according to another example embodiment of the present disclosure.

FIG. 7 illustrates an electrical power system 700 according to another example embodiment of the present disclosure. The electrical power system 700 is similar to the electrical power system 600 of FIG. 6, but the electrical power system 700 operates according to an active current share control.

A first power source 706 of the electrical power system 700 includes six power supply units PSU1, PSU2, PSU3, PSU4, PSU5 and PSU6, and a first load share bus 713. The second power source 708 includes six battery backup units BBU1, BBU2, BBU3, BBU4, BBU5 and BBU6 and a second load share bus 715.

In one example, the first power source 706 has a primary priority voltage setting (e.g., 12.6V), and the second power source 708 has a secondary priority voltage setting (e.g., 12.4V). As shown in FIG. 7, positive output terminals of the six power supply units of the first power source 706 and the six battery backup units of the second power source 708 are tied together (e.g., connected with one another) to supply power to a common load 704. Similarly, negative output terminals of the six power supply units of the first power source 706 and the six battery backup units of the second power source 708 are tied together.

In this example, all six power supply units of the first power source 706 will share the load demand in an active current share method via the first load share bus 713 with the primary priority voltage setting (e.g., 12.6V). At a peak load share voltage on the first load share bus 713 (e.g. 8V), the output capacity of the first power source 706 is exhausted.

The load share voltage of each of the load share buses 713 and 715 may be independent of the output voltage, because the load share voltage represents a load current. In one example, a full load current may be represented by a peak (e.g., maximum) load share voltage of 8V. In that case, a half load current would be represented by 4V.

The load share buses 713 and 715 are not tied together, so they may use the same load share voltage thresholds (e.g., 8V at a full load current). Alternatively, the load share buses 713 and 715 may use different load share voltage thresholds (e.g., a peak load share voltage on the bus 713 may be 8V while a peak load share voltage on the bus 715 is 6V).

Once the peak load share voltage is reached on the first load share bus 713, the first power source 706 may enter a protection operating mode of constant power or constant current while delivering a full output capacity of the first power source 706.

As the load demand increases, the second power source 708 (having a lower priority) will start to deliver DC power to the common load 704 in addition to the first power source 706. At this point, the six battery backup units of the second power source 708 dictate a DC output voltage of 12.4V based on the voltage setting of the second power source 708. All six power supply units of the first power source 706 and all six battery backup units of the second power source 708 now share and supply DC power to the load.

At a peak of the voltage of the second load share bus 715 (e.g., 8V), the total combined output capacity of the first and second power sources 706 and 708 is exhausted and the first and second power sources 706 and 708 will both operate in a protection mode. In the opposite direction, as the load demand decreases the DC output voltage will track back to the voltage setting of the first power source 706 (e.g., 12.6V) until the protection modes of both power sources 706 and 708 are disabled and the load demand goes low.

Figure 8:
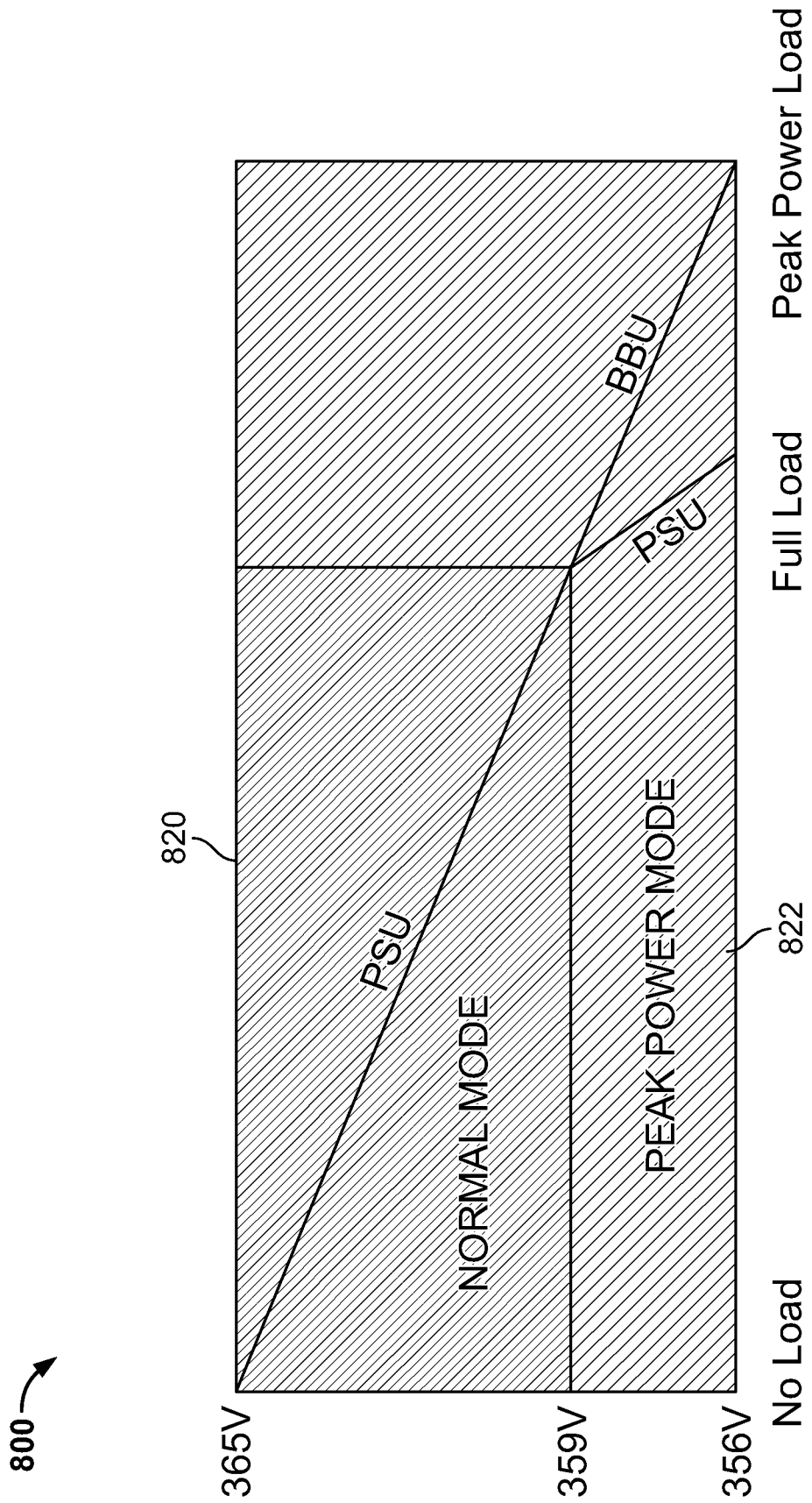
FIG. 8 is a line graph of an example priority power sharing V-I characteristic of the power system of FIG. 6.

FIG. 8 illustrates a line graph 800 of another example priority load share architecture operating according to a droop current share method. In the normal operating mode 820, one or more power supply units (PSUs) have a primary priority setting and share a droop load line of 365V down to 359V. As the load demand increases, the PSUs fall into a constant power protection mode.

At this point, one or more battery backup units take over the bus voltage in a peak power operating mode 822, and the battery backup unit(s) range the bus voltage from 359V down to 356V. In the peak power operating mode 822, the combined PSUs and battery backup unit(s) deliver DC power to the load. The DC output voltage will track back from 356V up to 365V as the load demand ramps down.

Figure 9:
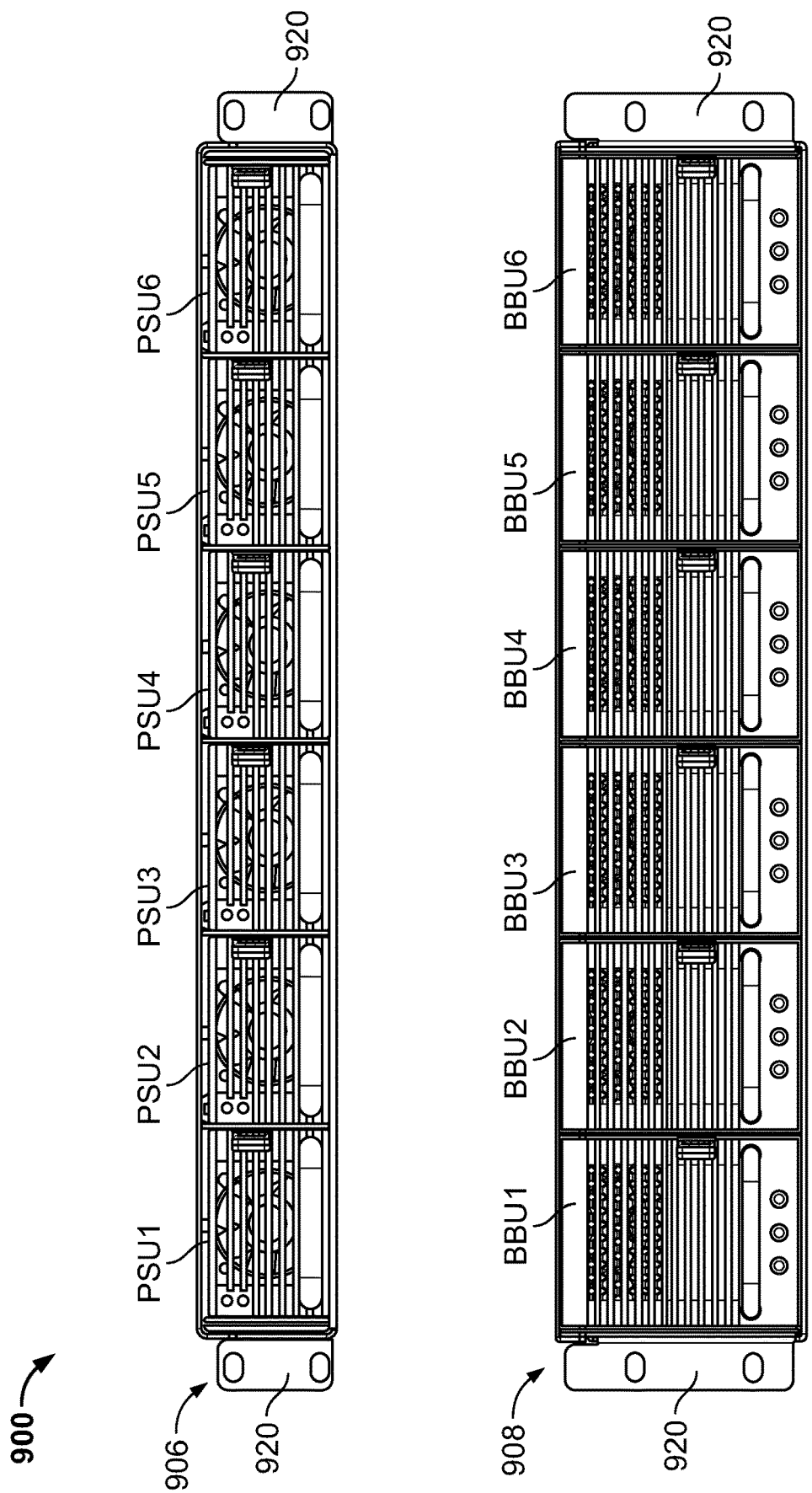
FIG. 9 is a front view of an electrical power system including rack-mountable units, according to another example embodiment of the present disclosure.

FIG. 9 illustrates an electrical power system 900 according to another example embodiment. The electrical power system 900 includes a first power source 906 including six power supply units PSU1, PSU2, PSU3, PSU4, PSU5 and PSU6. The electrical power system also includes a second power source 908 including six battery backup units BBU1, BBU2, BBU3, BBU4, BBU5 and BBU6. The power sources 906 and 908 may be similar to the power sources 606, 608, 706 and 708 illustrated in FIGS. 6 and 7.

As shown in FIG. 9, each power source 906 and 908 includes mounting brackets 920. Therefore, each power source power source 906 and 908 is rack-mountable in an equipment rack, such as a power distribution rack, etc. Although FIG. 9 illustrates each power source 906 and 908 as including two mounting brackets 920 each, other embodiments may include more or less mounting brackets 920, mounting brackets positioned at other locations on the power sources 906 and 908, mounting brackets including more or less than two holes, etc.

The example electrical power sources described herein may include any suitable sources for supplying power to a load, such as a DC-to-DC switched-mode power supply, an AC-to-DC switched-mode power supply (e.g., a rectifier), a utility grid supply, a generator, a solar power generation source, a wind power generation source, and a battery, etc.

In some cases, a power source may include multiple components such as an AC-to-DC converter connected with a utility grid supply, DC-to-DC converter coupled to a battery (e.g., a backup battery unit (BBU)), a DC-to-DC converter coupled to a solar or wind power generation source, etc. An electrical power system may include power sources of different types, power sources of the same type, etc.

The power sources may be configured to perform operations using any suitable combination of hardware and software. For example, the power sources may include any suitable circuitry, logic gates, microprocessor(s), computer-executable instructions stored in memory, etc. operable to cause the power sources to perform actions described herein (e.g., supplying power to a load in a constant voltage mode, a constant current mode, etc.).

As described above, a lower priority power source may continue to maintain an enabled on-state (e.g., hot state) even when the power source is not currently delivering DC power to the load. Therefore, the power source may be ready to deliver power to the load at any time load demand increases beyond a load capacity of a higher priority power source.

A power source may not require any command from the load to start supplying DC power to the load (or stop supplying power to the load). The power source may respond independent of the load or other power sources. For example, each power source may follow a predefined droop load line voltage for droop current sharing and a predefined load share voltage for active current sharing. Because load sharing decisions may occur independently and simultaneously, power sources in example embodiments described herein may respond faster and adapt to fast load transients more quickly than power systems that require control commands to enable and disable different power sources.

In some embodiments, power sources may provide automatic priority load sharing without receiving a command from the load, without disabling one of the power sources, without disconnecting one of the power sources from the output of the power system, etc. For example, power sources of all priority levels may be tied up (e.g., connected together) and powered on continuously without requiring monitoring of the power sources or load demand, without requiring turning on and turning off different power sources, without requiring disconnecting different power sources from an output bus, etc. Therefore, some power sources may provide automatic (e.g., automated) priority load sharing.

In some embodiments, a power source priority level may be defined simply by a priority voltage setting (e.g., different droop load lines in a droop current share method, different load share bus voltage settings in an active current share method, etc.). The power source priority level may be set to an initial priority sequence, and the priority sequence of the power sources may be changed during operation of the power system.

In some cases the priority of power sources is predefined prior to operation of the power system and does not need to be updated on the fly. For example, a power system may include a power supply unit (PSU) and a battery backup unit (BBU), where the PSU is always the primary power source and the BBU is always the secondary power source because the BBU may have a limited and time-bounded capacity.

Another example is a power system that requires peak power, where a PSU supplies power during a normal load demand and a BBU supplies a peak power during a peak load demand. This system may provide an advantage of fully utilizing a PSU power system and infrastructure while transferring excess power capacity to a BBU for peak power requirements.

In cases where primary and secondary power sources are similar or the same (e.g., both sources are PSUs), the power system may command the different power sources to change priority levels. When the system commands a primary PSU to become a secondary PSU, the primary PSU may change its specified output voltage regulation setting down to a specified output voltage regulation setting of the secondary PSU (e.g., reduce from 12.6V to 12.4V). Similarly, the secondary PSU may increase its specified output voltage regulation setting up to the specified output voltage regulation setting of the secondary PSU (e.g., increased from 12.4V to 12.6V).

In some embodiments, priority of power sources may be changed for preventative maintenance on a primary power source where the primary power source is still capable of delivering limited power. In this case, the primary power source may be set as a secondary power source while the power source is in preventative maintenance. This approach could also apply to preventative maintenance for BBUs.

As another example, priority of power sources may be changed for reliability, to address degradation, etc. A primary power source that always delivers power to a load has a higher usage than a secondary power source. In order to balance uneven usage of different power sources, the priority of the different power sources may be rotated.

The example power systems described herein may be used in any suitable application, including a hyperscale application where a grid powered PSU is load sharing with a BBU, multiple BBUs in a rotating/alternating/changing load share priority, multiple BBUs in a power system delivering DC power to a common load, etc. For example, each BBU could have a different priority level to balance out a number of discharge cycles per BBU, to operate a new BBU in load sharing with an old BBU, etc.

Example embodiments described herein may use a common load share control method for all power sources having different priority levels, which may increase development and testing leverage (e.g., PSUs and BBU may have the same interface and control, etc.). A common protection scheme may be applicable to power sources having different priorities (e.g., a same constant power or constant current scheme for both a PSU and a BBU, etc.).

According to another aspect of the present disclosure, a method of prioritizing load sharing in an electrical power system is disclosed. The electrical power system including an output for supplying a DC output voltage to a load, a first power source connected with the output, and a second power source connected with the output.

The method includes supplying DC power to the load using only the first power source when a demand of the load is less than an output capacity of the first power source, and supplying DC power to the load using both the first power source and the second power source when a demand of the load is greater than an output capacity of the first power source. The method also includes maintaining the second power source in an enabled on-state when only the first power source is supplying DC power to the load.

In some embodiments, supplying DC power to the load using only the first power source may include operating the first power source to regulate the DC output voltage in a constant voltage regulation mode. Supplying DC power to the load using both the first power source and the second power source may include operating the first power source in a constant current or constant power mode and operating the second power source to regulate the DC output voltage in a constant voltage regulation mode.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An electrical power system comprising:
    an output for supplying a DC output voltage to a load;
    a first power source connected with the output for generating DC power, the first power source configured to:
        regulate the DC output voltage to the load in a constant voltage regulation mode in response to a demand of the load being less than an output capacity of the first power source;
        transition from the constant voltage regulation mode to an alternate mode in response to the demand of the load increasing from a value less than the output capacity of the first power source to a value greater than the output capacity of the first power source, the alternate mode comprising one of a constant current mode and a constant power mode; and
        transition from the alternate mode to the constant voltage regulation mode in response to the demand of the load decreasing from a value greater than the output capacity of the first power source to a value less than the output capacity of the first power source; and
    a second power source connected with the output for generating DC power and configured to:
        start supplying DC power to the load in response to the demand of the load increasing from a value less than the output capacity of the first power source to a value greater than the output capacity of the first power source; and
        stop supplying DC power to the load in response to the demand of the load decreasing from a value greater than the output capacity of the first power source to a value less than the output capacity of the first power source.

2. The electrical power system of claim 1, wherein the second power source is configured to regulate the DC output voltage in a constant voltage regulation mode during operation of the first power source in the alternate mode.

3. The electrical power system of claim 2, wherein the electrical power system is configured to:
supply DC power to the load using only the first power source during operation of the first power source in the constant voltage regulation mode; and
supply DC power to the load using both the first power source and the second power source during operation of the first power source in the alternate mode.

4. The electrical power system of claim 1, wherein the first power source has a higher droop load line voltage setting range than a range of a droop load line voltage setting of the second power source.

5. The electrical power system of claim 1, wherein the second power supply is configured to operate in an enabled-on state in response to the first power source operating in the constant voltage regulation mode; and
wherein the enabled-on state comprises the second power source producing DC power but not supplying the produced DC power to the load.

6. The electrical power system of claim 5 further comprising a third power source connected with the output to supply DC power to the load, wherein the electrical power system is configured to:
supply DC power to the load using only the first power source and the second power source in response to the demand of the load being greater than the output capacity of the first power source and less than a combined output capacity of the first power source and the second power source; and
supply DC power to the load using the first, second, and third power sources in response to the demand of the load being greater than the output capacity of the first and second power sources.

7. The electrical power system of claim 6, wherein the third power source is configured to maintain the enabled on-state in response to not supplying DC power to the load.

8. The electrical power system of claim 1, wherein:
the first power source includes multiple power supplying devices connected with a first load share bus;
the second power source includes multiple other power supplying devices connected with a second load share bus; and
an output voltage regulation setting of the first power source is greater than an output voltage regulation setting of the second power source.

9. The electrical power system of claim 8, wherein the output voltage regulation setting of the first power source is 12.6V and the output voltage regulation setting of the second power source is 12.4V.

10. The electrical power system of claim 8, wherein the output voltage regulation setting of the first power source is separated from the output voltage regulation setting of the second power source by at least a specified guard band value to inhibit interaction of active current sharing control of the first load share bus and active current sharing control of the second load share bus.

11. The electrical power system of claim 1, wherein the first power source includes a switched-mode power supply and the second power source includes a backup battery unit.

12. The electrical power system of claim 1, wherein the electrical power system is configured to switch the first power source to a secondary priority setting and switch the second power source to a primary priority setting, during operation of the power system.

13. A method for supplying a DC output voltage from an output to a load, the method comprising:
regulating, via a first power source coupled with the output, the DC output voltage to the load in a constant voltage regulation mode in response to a demand of the load being less than an output capacity of the first power source;
transitioning from the constant voltage regulation mode to one of a constant current mode and a constant power mode in response to the demand of the load increasing from a value less than the output capacity of the first power source to a value greater than the output capacity of the first power source;
transitioning from the one of the constant current mode and the constant power mode to the constant voltage regulation mode in response to the demand of the load decreasing from a value greater than the output capacity of the first power source to a value less than the output capacity of the first power source;
supplying DC power to the load via a second power source in response to the demand of the load increasing from a value less than the output capacity of the first power source to a value greater than the output capacity of the first power source; and
ceasing supply of the DC power to the load via the second power source in response to the demand of the load decreasing from a value greater than the output capacity of the first power source to a value less than the output capacity of the first power source.

14. The method of claim 13 further comprising regulating the DC output voltage in a constant voltage regulation mode via a second power source connected with the output during operation of the first power source in the alternate mode.

15. The method of claim 14 further comprising:
supplying DC power to the load using only the first power source during operation of the first power source in the constant voltage regulation mode; and
supplying DC power to the load using both the first power source and the second power source during operation of the first power source in the alternate mode.

16. The method of claim 13 further comprising operating the second power supply in an enabled-on state in response to the first power source operating in the constant voltage regulation mode; and
wherein the enabled-on state comprises the second power source producing DC power but not supplying the produced DC power to the load.

17. The method of claim 16 further comprising:
supplying DC power to the load using only the first power source and the second power source in response to the demand of the load being greater than the output capacity of the first power source and less than a combined output capacity of the first power source and the second power source; and
supplying DC power to the load using the first power source, the second power source, and a third power source in response to the demand of the load being greater than the output capacity of the first and second power sources.

18. The method of claim 17 further comprising maintaining the third power source in the enabled on-state in response to not supplying DC power to the load.

19. An electrical power system comprising:
an output for supplying a DC output voltage to a load;
a first power source connected with the output for generating DC power, the first power source configured to:

regulate the DC output voltage to the load in a constant voltage regulation mode in response to a demand of the load being less than an output capacity of the first power source;

transition from the constant voltage regulation mode to an alternate mode in response to the demand of the load increasing from a value less than the output capacity of the first power source to a value greater than the output capacity of the first power source, the alternate mode comprising one of a constant current mode and a constant power mode; and transition from the alternate mode to the constant voltage regulation mode in response to the demand of the load decreasing from a value greater than the output capacity of the first power source to a value less than the output capacity of the first power source; and a second power source connected with the output for generating DC power;

wherein:

the first power source includes multiple power supplying devices connected with a first load share bus;

the second power source includes multiple other power supplying devices connected with a second load share bus; and an output voltage regulation setting of the first power source is greater than an output voltage regulation setting of the second power source.

20. An electrical power system comprising:

an output for supplying a DC output voltage to a load;

a first power source connected with the output for generating DC power, the first power source configured to:

regulate the DC output voltage to the load in a constant voltage regulation mode in response to a demand of the load being less than an output capacity of the first power source;

transition from the constant voltage regulation mode to an alternate mode in response to the demand of the load increasing from a value less than the output capacity of the first power source to a value greater than the output capacity of the first power source, the alternate mode comprising one of a constant current mode and a constant power mode; and transition from the alternate mode to the constant voltage regulation mode in response to the demand of the load decreasing from a value greater than the output capacity of the first power source to a value less than the output capacity of the first power source; and a second power source connected with the output for generating DC power;

wherein the electrical power system is configured to switch the first power source to a secondary priority setting and switch the second power source to a primary priority setting, during operation of the power system.

* * * * *